United States Patent [19]

Lipowitz

[11] Patent Number: 4,743,662

[45] Date of Patent: May 10, 1988

[54] INFUSIBLE PRECERAMIC POLYMERS VIA PLASMA TREATMENT

[75] Inventor: Jonathan Lipowitz, Midland, Mich.

[73] Assignee: Dow Corning Corporation, Midland, Mich.

[21] Appl. No.: 926,168

[22] Filed: Nov. 3, 1986

[51] Int. Cl.[4] .................... C08F 283/00; C08G 77/04; C04B 35/56; B05D 3/06
[52] U.S. Cl. ...................................... 525/474; 528/28; 528/31; 528/32; 528/34; 501/87; 501/88; 427/39; 427/40
[58] Field of Search ....................... 427/38, 39, 40, 44; 556/412; 528/31, 32, 34; 501/87, 88; 264/61, 65

[56] References Cited

U.S. PATENT DOCUMENTS

| | | | |
|---|---|---|---|
| 4,568,563 | 2/1986 | Jackson et al. | 427/40 |
| 4,631,260 | 12/1986 | Bartos et al. | 501/87 |
| 4,687,657 | 8/1987 | Clark et al. | 423/512 |

FOREIGN PATENT DOCUMENTS 2583744 12/1986 France .

Primary Examiner—Norman Morgenstern
Assistant Examiner—Margaret Burice
Attorney, Agent, or Firm—Robert L. McKellar

[57] ABSTRACT

What is disclosed is a method of rendering shaped preceramic polymers infusible prior to the pyrolysis of such polymers by treating the shaped preceramic polymer with a plasma.

19 Claims, 5 Drawing Sheets

INFUSIBLE PRECERAMIC POLYMERS VIA PLASMA TREATMENT

The Government has rights in this invention pursuant to Contract No. F33615-83-C-5006 awarded by the United States Air Force.

BACKGROUND OF INVENTION

This invention relates to the preparation of preceramic materials or articles by the pyrolysis of preceramic polymers wherein the preceramic polymers are rendered infusible prior to pyrolysis by treatment with a plasma. This method is especially suited for the preparation of ceramic fibers.

Plasma chemistry deals with the occurrence of chemical reactions in a partially ionized gas composed of ions, electrons, and neutral species. This matter is produced through the action of either very high temperatures or strong electric or magnetic fields. In this latter type of discharge, free electrons gain energy from an imposed energy field and lose this energy through collisions with neutral gas molecules. The transfer of energy to the molecules leads to the formation of a variety of new species including metastables, atoms, free radicals, and ions. These unique new species allow a different approach to the cure of the certain preceramic polymers owing to the fact that with plasma, the temperatures are sufficiently low so that the solid being treated is not damaged or distorted as it may be in a thermal treatment. The instant method takes advantage of the active species generated in the plasma. A second advantage is that plasma processes can be controlled easily through the large number of independent parameters influencing the properties of the plasma. It was believed by the inventor herein that such a source of energy could be used to lend enough cure to certain preceramic polymers to allow the preceramic polymer to be rendered infusible enough to handle and to pyrolyze the polymer after a shape had been formed from it. In addition, the inventor herein wished to obtain a shaped article from the preceramic polymer, which could be cured to the handleable stage, without introducing oxygen into the polymer, and thus into the final ceramic product.

The art is replete with examples of the use of plasma to lay down thin films from organosilicon monomers, as well as organic monomers, but there does not seem to be any prior notion that the same type of energy source could be used to cure certain shaped preceramic polymers.

The prior art discloses that ceramic materials have been prepared by the pyrolysis of preceramic polymers. Gaul in U.S. Pat. No. 4,312,970 (issued Jan. 26, 1982) obtained ceramic materials by the pyrolysis of preceramic silazane polymers, which polymers were prepared by reacting organochlorosilanes and disilazanes. The preceramic silazane polymers were pyrolyzed in an inert atmosphere without any separate treatment to render the silazane preceramic polymer infusible.

Gaul in U.S. Pat. No. 4,340,619 (issued July 20, 1982) obtained ceramic materials by the pyrolysis of preceramic silazane polymers, which polymers were prepared by reacting chlorine-containing disilanes and disilazanes. Fibers prepared from such preceramic silazane polymers were given a "mild heat treatment" in air before pyrolysis but there is no teaching that such a treatment rendered the fibers infusible.

Cannady in U.S. Pat. No. 4,540,803 (issued Sept. 10, 1985) obtained ceramic materials by the pyrolysis of preceramic silazane polymers, which polymers were prepared by reacting trichlorosilane and disilazane. The preceramic silazane polymers were not rendered infusible prior to pyrolysis, in order to form ceramic materials.

THE INVENTION

What has been discovered therefore is a method of rendering shaped preceramic polymers infusible prior to pyrolysis, which method comprises (I) treating a shaped preceramic polymer with a useful plasma for a time sufficient to render the preceramic polymer infusible wherein the treatment temperature is sufficiently low so that the preceramic polymer remains unfused during the treatment step. This method represents a significant advance in the art of preparing ceramic materials or articles, especially in the art of preparing ceramic fibers.

This invention also relates to a method of preparing preceramic fibers wherein the preceramic fibers have been rendered infusible by the method of this invention. Thus, this invention relates to preceramic fibers prepared by the method comprising the steps of (I) preparing a preceramic polymer; (II) preparing preceramic fibers from said preceramic polymer; (III) exposing the preceramic fibers prepared in step (II) to a plasma for a time sufficient to render the fibers infusible wherein the treatment temperature is sufficiently low so that the fiber remains unfused during the treatment step.

Treatment of preceramic polymers using plasma results in an infusible polymer suitable for pyrolysis to a ceramic material. Preceramic polymers in the form of pellets, powders, flakes, foams, fibers, films and coatings and the like are especially suitable for treatment with plasma by the method of this invention. For purposes of this invention, one or more of the dimensions of the forms useful in this invention must be small, that is, on the order of about 1 mm, in order to permit reactive plasma gases to diffuse sufficiently into the polymer to effect modification of the polymer. The form of the polymer will then remain upon subsequent pyrolysis to give a ceramic article. Preferred for this invention are fibers, films, coatings and powders.

Gases which can be used in this invention as the plasma are those in which reactive species are produced which can permit formation of stable crosslinks after reaction with the preceramic polymer. Such reactive species are, for example, N, NH, CH, $CH_2$, H, S, $C_2$, AlH, AlN, B, $BH_3$, $B_2$, $C_2H$, SiH, $SiH_2$, and BH and various ionic species. Thus, "useful" gases in this invention are, for example, $NH_3$, $N_2$, $H_2$, $H_2O$, $O_2$, diborane, silanes and methane. It was found during the investigation of this invention, that argon did not work as a plasma gas and therefore, argon is not considered to be within the scope of this invention.

One benefit of this invention is that it is possible to modify the surface composition and the bulk composition of the cured article by appropriate choice of the gas used to form the plasma. For example, if it is desired to produce a nitrogen-rich surface or composition, ammonia, nitrogen, methylamine, or even hydrazine may be used as the plasma gas. A hydrocarbon may be used to produce a carbon-rich surface or composition. Diborane or $BCl_3$ is used to produce a boron-rich surface or composition. Silanes may be used to produce a Si-rich surface. It is obvious that many elements, especially those that are di- or polyvalent, can be incorporated into the cured polymer by using an appropriate gas or gas mixture in the plasma. On pyrolysis to a ceramic article, many of these elements will be retained on the surface and within the ceramic article.

The method of this invention is carried out by obtaining, or preparing, a preceramic polymer and shaping it into the desired shape or form, such as a fiber. The fiber is then placed between the electrodes of a power source and the energy applied for the appropriate time under the appropriate reaction conditions until the fiber is rendered infusible. What is meant by "infusible" in this invention is that the treated preceramic polymer when heated rapidly up to the pyrolysis temperature will not fuse together. A crude screen for infusibility is provided by the solubility of the preceramic polymer in toluene. Prior to treatment by the process this invention, the preceramic polymers are almost completely soluble in toluene. The infusible preceramic polymers obtained by treatment by the method of this invention are either insoluble in toluene or have only limited solubility in toluene.

Figure 5:
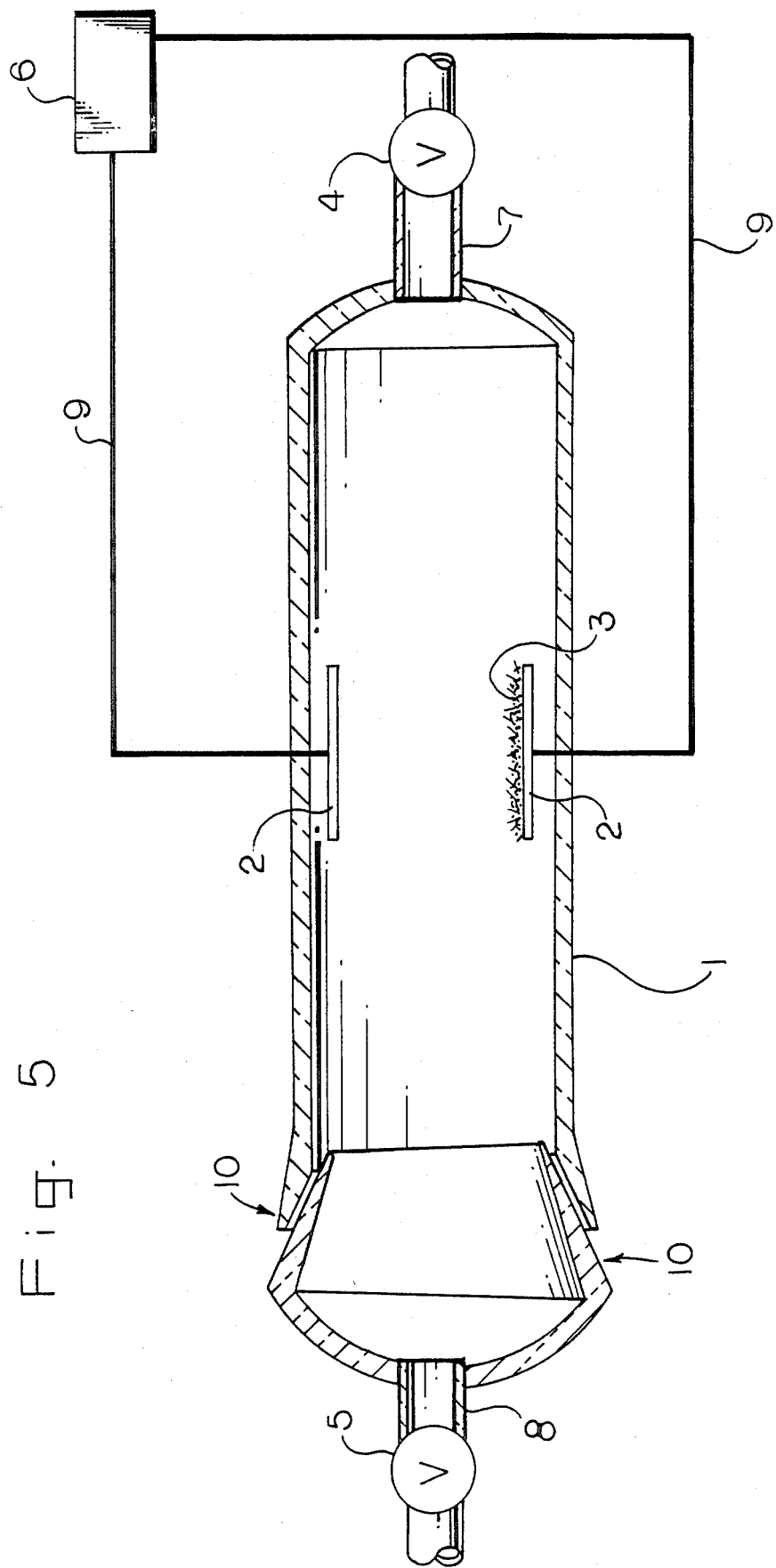
FIG. 5 is an illustration of the lab scale apparatus that was used to obtain the results found in the examples herein.

When the preceramic polymer is in the shape of a formed object such as a fiber it is not necessary to render the entire shaped article infusible. Rather only the outer surfaces, and sufficient interior portions directly adjacent to the outer surfaces, need be rendered infusible. The interior portion of the shaped article may be cured during the pyrolysis of the shaped article to elevated temperature. Simply rendering the exterior infusible will prevent the shaped articles from fusing together during the pyrolysis unless a break in the exterior surface occurs which allows the nonfused interior to leak out. Thus, referring to FIG. 5, there is shown a two-piece crude reactor 1, which, for purposes of illustration, is a quartz glass tube having ground glass fittings 10, which has at one end, an entry port 8 for the gas to enter the reactor 1. The entry of the gas to the reactor 1 is controlled by a valve 5, which, as illustrated here, is a glass valve. At the end of the tube, opposite the entry port, there is located an exit port 7, through which the unused gases and the reaction by-products are allowed to escape. This exit port is controlled by a valve 4, much the same as the entry port valve 5. Located within the reactor 1, is a set of electrodes, 2 which are set a predetermined distance apart from each other. Connected to each electrode 2, is an electrical lead 9, which leads to a power source 6. Situated on the bottom electrode are the preceramic fibers 3. When electrical energy is supplied to the electrodes 2, while gas at suitable pressure is allowed to enter the reactor 1, through the entry port 8, a plasma is formed and the plasma treats the fibers that are situated in the direct path of the electrodes, to render them infusible. The temperature of treatment of the preceramic polymers by the plasma is not narrowly critical but the temperature must be sufficiently low so that the preceramic polymer does not melt or fuse during the treatment step. Preferably, the treatment temperature is below the softening temperature of the preceramic polymer. For purposes of this invention, the reaction is run under partial vacuum or low pressure. The preferred pressure for use in this invention is 0.05 Torr to 5 Torr. The flow rate of the gas is dependent on the pressure one desires to operate under. For purposes of this invention, the flow rate of the gas can vary from 0.01 cc/minute to about 10 cc/minute.

The amount of time that is required to get the effect desired by the method of this invention is dependent on the thickness of the sample that one is subjecting to the plasma. Generally, the samples range in thickness from about 0.05 microns to about 30 microns. Obviously, the thicker samples will require more exposure time than the thinner samples. Thus, for purposes of this invention, the time of exposure varies from about 5 minutes to about three hours. It depends somewhat on pressure, plasma wattage or power, the particular polymer being cured and plasma gas or gases being used.

The preceramic polymers that are useful in this invention are those that are known in the art as polysilazanes, such as, for example, those shown and discussed in the above mentioned U.S. patents to Gaul, and Cannady. The preceramic silazane polymers suitable for use in this invention must be capable of being converted to a ceramic material at elevated temperatures. It is generally preferred that the preceramic silazane polymers used in this invention be capable of being converted to a ceramic material in at least forty weight percent yield. Mixtures of preceramic silazane polymers may also be used in this invention. As indicated above, examples of preceramic silazane polymers or polysilazanes suitable for use in this invention include polysilazanes as described by Gaul in U.S. Pat. Nos. 4,312,970 (issued Jan. 26, 1982), 4,340,619 (issued July 20, 1982), 4,395,460 (issued July 26, 1983), and 4,404,153 (issued Sept. 13, 1983), all of which are hereby incorporated by reference. Suitable polysilazanes also include those described by Haluska in U.S. Pat. No. 4,482,689 (issued Nov. 13, 1984) and by Seyferth et al. in U.S. Pat. No. 4,397,828 (issued Aug. 9, 1983). Other suitable polymers are those disclosed in Cannady U.S. Pat. No. 4,450,803 set forth above and the Cannady U.S. Pat. Nos. 4,535,007 and 4,543,344, as well as Bujalski in U.S. patent application Ser. No. 653,003 now U.S. Pat. No. 4,668,642 issued May 26, 1987 on continuation application Ser. No. 837,236 (filed Sept. 21, 1984), and by Baney et al. in U.S. patent applications Ser. No. 652,938, now U.S. Pat. No. 4,666,872 issued May 19, 1987 on continuation application Ser. No. 837,245 (filed Sept. 21, 1984) and Ser. No. 652,939 (filed Sept. 21, 1984), all of which are hereby incorporated by reference.

U.S. patent application Ser. No. 652,939 discloses that a $R_3SiNH$-containing silazane polymer prepared by the procedure outlined in U.S. Pat. No. 4,340,619 was employed in preparation of modified preceramic polymer. The polymer was prepared by combining hexamethyldisilazane (42.2 pounds) and a mixture of methylchlorodisilanes (26 pounds) in a 72 liter stainless steel reactor under a nitrogen atmosphere. The methylchlorodisilane mixture, obtained from the Direct Process, contained 42.5 weight percent [(CH$_3$)Cl$_2$Si]$_2$, 35.6 weight percent (CH$_3$)$_2$ClSiSiCl$_2$(CH$_3$), 9.5 weight percent [(CH$_3$)$_2$ClSi]$_2$, and 12.4 weight percent of chlorosilane low boilers. The reaction mixture was heated to 195° C. under nitrogen at a rate of 0.97° C./min while volatile by-products were removed by distillation. The polymer residue was collected and was found to have a softening point of 68° C. To modify the polymer, several different inorganic compounds were added to the R$_3$SiNH-containing silazane polymer at levels to yield a 1 percent by weight, based on the metal, mixture. The additives used were iron (II) octoate, cobalt (II) octoate, copper (II) octoate, and nickel (II) octoate. All were mixed using the solution method with toluene as the solvent. The solution method of mixing consisted of dissolving the desired amount of inorganic compound additive in dry toluene. The R$_3$SiNH-containing silazane polymer was added to the toluene solution to give a 35 weight percent solution. The resulting solution was placed in a glass jar, purged with argon, and then sealed. The solution was then agitated for 16 hours on a wheel mixer. Solvent was removed from the modified R$_3$SiNH-containing silazane by vacuum stripping for three hours at 25° C. and 3 mm Hg and for one hour at 50° C. and 2 mm Hg.

Still other preceramic polymers may be suitable for use in this invention. Such other preceramic polymers can be, for example, polycarbosilanes such as those taught in Yajima et al., U.S. Pat. No. 4,100,233 (issued on July 11, 1978), and the methylpolysilanes as set forth in U.S. Pat. No. 4,310,651 (issued Jan. 12, 1982); U.S. Pat. No. 4,310,482 (issued on Jan. 12, 1982); U.S. Pat. No. 4,310,481 (issued on Jan. 12, 1982); U.S. Pat. No. 4,314,956 (issued on Feb. 9, 1982); U.S. Pat. No. 4,298,559 (issued on Nov. 3, 1981); U.S. Pat. No. 4,534,948 (issued on Aug. 13, 1985) and Reissue U.S. Pat. No. Re. 31447, (issued Nov. 22, 1983). After the preceramic polymer has been rendered infusible by treatment with plasma, the infusible preceramic polymer is fired to an elevated temperature of at least 400° C. in an inert atmosphere, vacuum or ammonia-containing atmosphere until the mixture is converted to a ceramic, or ceramic-containing, material. Preferably, the pyrolysis temperature is from about 1000° C. to about 1600° C. Since the preceramic polymers of this invention have been rendered infusible prior to pyrolysis, the pyrolysis step may be carried out by quickly raising the temperature to the desired level. If the preceramic polymer is of sufficient viscosity or if it possesses a sufficiently low melt temperature, it is shaped first, then rendered infusible, and then finally pyrolyzed to give a ceramic shaped article such as a fiber. The pyrolysis, or partial pyrolysis suggested above does not form a part of the instant invention.

So that those skilled in the art can better appreciate and understand the invention, the following examples are given. Unless otherwise indicated, all percentages are by weight.

The electrical power source used in the reactor of these examples was a Plasmaloc 1 power supply, ENI Power Systems, Inc. 100 High Power Road, Rochester, N.Y. 14623, U.S.A. The analytical data was achieved using Scanning Auger Microscopy (SAM). Pertinent data on this method can be found in (SAM "Auger Electron Spectroscopy", Michael Thompson, Univ. of Toronto, pp. 394, J. Wiley & Sons (1985)) Samples for elemental analysis were ground using a Brinkmann grinding machine with zirconia or tungsten carbide surfaces. Elemental analyses were obtained by the following methods:

Silicon—Sodium peroxide digestion and analysis by atomic absorption spectrometry or by Inductively Coupled Plasma. (E. G. Gooch and P. R. Roupe, "Organic Acid Acidification of High Salt Solutions in Determination of Metals by Atomic Absorption Spectrometry", Analyt. Chem., 51, 2410 (1979).

Carbon and Nitrogen—A high temperature combustion method was employed, using a Carlo Erba Elemental Analyzer Model 1106.

Oxygen—A high temperature carbothermic reduction method was used, using an Oxygen Determinator Model R0316, Leco Corporation, St. Joseph, Mich. U.S.A.

EXAMPLE 1

A preceramic polymer was prepared by the method of Gaul from U.S. Pat. No. 4,312,970, in which the empirical formula was [(CH$_3$)$_{2.6}$Si$_2$]$_1$[C$_6$H$_5$(CH$_3$Si]$_{0.2}$(NH)$_{1.3}$[NHSi(CH$_3$)$_3$]$_{0.8}$(Cl)$_{0.2}$(O)$_{0.1}$, having an average molecular weight of about 1200. This preceramic polymer was spun into a single filament fiber using nitrogen as an inert gas so as to obtain a fiber having the lowest oxygen content possible. Approximately 0.2 grams of the fiber was loaded into the quartz glass reactor described above, while the reactor was inside an inert atmosphere in a glove box. This was done to reduce the exposure of the fiber to air and moisture. The fibers were loosely piled on one of the rectangular electrodes which had an approximate surface area of 4×6 cm. The distance of the fibers from the second electrode was about 4 cm. The reactor was connected to a vacuum line on its exit port end and high purity ammonia was passed into the reactor through the entry port at a rate sufficient to maintain about 0.25 torr of ammonia pressure in the vacuum pumped reactor.

The plasma conditions were chosen to maintain a stable plasma and were: 0.25 torr pressure; 5 watts of power, and 125 khZ frequency. The fibers were allowed to be exposed to these conditions for 45 minutes. The fibers were removed from the reactor while the reactor was in a glove box.

The fibers that were directly in the path of the electrodes were insoluble in toluene, indicating that the fibers were at least partially cured. Those fibers not in the direct path of the electrodes were soluble in the toluene.

The fibers exposed to the plasma were protected from air and moisture prior to pyrolyzing at 3° C./min. to 1200° C. in argon (no hold time at temperature). After pyrolyzing, the fibers were partly matted and fused with a number of well formed fibers projecting from the partially fused mass. An 81% char yield on pyrolysis was obtained, giving 0.13 grams of ceramic fiber. An elemental analysis of these pyrolyzed fibers was as follows:

| Weight % | Element |
| --- | --- |
| 33.2 | C |
| 20.8 | N |
| 0.79 | O |
| <0.05 | H |
| Remainder | Si and a small amount of Cl |

When a sample of the preceramic polymer was not treated with plasma (not rendered infusible), and was fired to 1260° C. in argon with 15 minute hold at 1260° C., the ceramic had the following elemental results:

| Weight % | Element |
|---|---|
| 30.6 | C |
| 17.2 | N |
| 1.8 | O |
| 45.5 | Si |

The data shows that an additional 3.5% of nitrogen was added to the polymer by the use of ammonia plasma treatment. A TGA analysis showed about 17% weight loss on heating to 1550° C. at 10° C./min. followed by a 35 min. hold at 1550° C. Weight loss begins at about 1500° C. Similar fibers treated whereby oxygen is incorporated show greater weight loss under these conditions, beginning at about 1400° C. These fibers are thus more thermally stable than air cured ceramic fibers.

A similar experiment using an argon plasma at 25 khZ (0.25 torr argon, 5 watts, and 45 minutes) gave no cure as shown by rapid solubility in toluene.

EXAMPLE 2

This example deals with the treatment of two different types of preceramic polymers according to this invention. Preceramic polymer number 1 is the polymer from example 1 above. Preceramic polymer number 2 is a polymer that was prepared by the method of Cannady from U.S. Pat. No. 4,540,803. "Green" for purposes of this example means before the polymer was treated by the plasma. The degree of cure was tested by the crude toluene solubility test, in which the fibers after treatment were simply immersed in a beaker of toluene and the solubility, or the lack thereof, was observed. Those fibers that were fully soluble were deemed to not have been affected by the treatment while those fibers that were insoluble or only partially insoluble in the toluene were considered to have been effected by the treatment. The results can be found in Table I, and the pyrolysis data on the fibers can be found in Table II.

TABLE I

PLASMA TREATMENT

| Sample | % O (green) | Time | Atms.** | Press. (torr) | Flow rate cm³/min. | Sample Solubility |
|---|---|---|---|---|---|---|
| 1a | .62 | 30 min. | NH₃ | .35 | 1 | No |
| 1b | .62 | 15 min. | NH₃ | .35 | 1 | No |
| 1c | .62 | 5 min. | NH₃ | .35 | 1 | Yes |
| 1d | .62 | 1.5 hrs. | N₂ | .25 | 1 | Partial |
| 1e* | — | 3.0 hrs. | N₂ | .25 | 1 | Partial |
| 1f | .62 | 1.0 hrs. | H₂ | .25 | 1.7 | Partial |
| 2a | .25 | 45 min. | Ar | .25 | 1 | Yes |
| 2b | .25 | 1.0 hrs. | NH₃ | .25 | 1 | Partial |
| 2c | .25 | 1.0 hrs. | N₂ | .25 | 1 | Partial |
| 2d | .25 | 1.0 hrs. | H₂ | .25 | 1 | Yes |

The frequency used on these samples was 125 khZ. The power used on these samples was 5 watts using 2" × 3" electrodes.
*This sample was a bundle of fibers and was O₂ contaminated.
**Atmosphere

TABLE II

PYROLYSIS DATA

| Sample | Result | % Char | % O | % C | % H | % N |
|---|---|---|---|---|---|---|
| 1a | fused | 81.2 | 0.90 | 31.6 | <.05 | 17.5 |
| 1b | fused | 61.3 | 0.91 | — | — | — |
| 1c | fused | 79.3 | 0.96 | 31.8 | .16 | 17.5 |
| 1d | *passed | 75.2 | 0.88 | 31.6 | <.05 | 17.4 |
| 1e | passed | 77.1 | 4.9 | — | — | —** |
| 1f | passed | 73.1 | 1.11 | 30.0 | <.05 | 18.0 |
| 2a | melted | 56.2 | 0.78 | — | — | — |
| 2b | fused | 53.4 | 0.82 | 12.8 | <.05 | 27.8 |
| 2c | melted | 54.6 | 0.62 | 13.4 | — | 28.2 |
| 2d | fused some fibers | 60.4 | 2.4 | — | — | — |

*passed means that the fibers were separable, unfused fibers having a full cure by this treatment. Fused means that fibers were partially fused and inseparable.
**O₂ contamination

EXAMPLE 3

Three separate fibers prepared by the method of the instant invention were subjected to Scanning Auger Microscopy (SAM—"Auger Electron spectroscopy", Michael Thompson, Univ. of Toronto, pp. 394, J. Wiley & Sons (1985)). SAM is capable of analyzing a small area of a sample, approximately 50 Å in depth and 300 nm (0.3 μm) in diameter. The sample can then be sputtered, using energetic argon ions (Ar+) to remove sample and permit analysis of a deeper layer within the sample. By a series of sputtering and analysis cycles, a compositional depth profile can be generated into a sample. Such a series of plots is shown in the Figures. Note that large variations in surface and near-surface compositions can be obtained by variation of plasma gas used. Elemental analyses obtained using SAM are not absolute for two reasons. One reason is the sensitivity factors for each element are not constant, but vary as a function of other elements present, and two, sputtering with high energy Ar+ may change the composition from that originally present.

Even with the above two complications, elemental analysis artifacts within a single sample tend to reach a steady state after several sputtering/analysis cycles and changes in composition as a function of depth are real, even through the absolute values of each element are not exactly correct. Furthermore, differences seen between the same preceramic polymer as a result of different plasma cures are real though the absolute values of each element are not correct.

Thus, bearing the above in mind the data clearly shows that the plasma can be used to cure preceramic polymers without introduction of oxygen and, the surface of ceramic fibers can be chemically modified by appropriate choice of plasma gas and plasma parameters. This surface modification is important in controlling fiber-matrix interface phenomena in composites.

Figure 1:
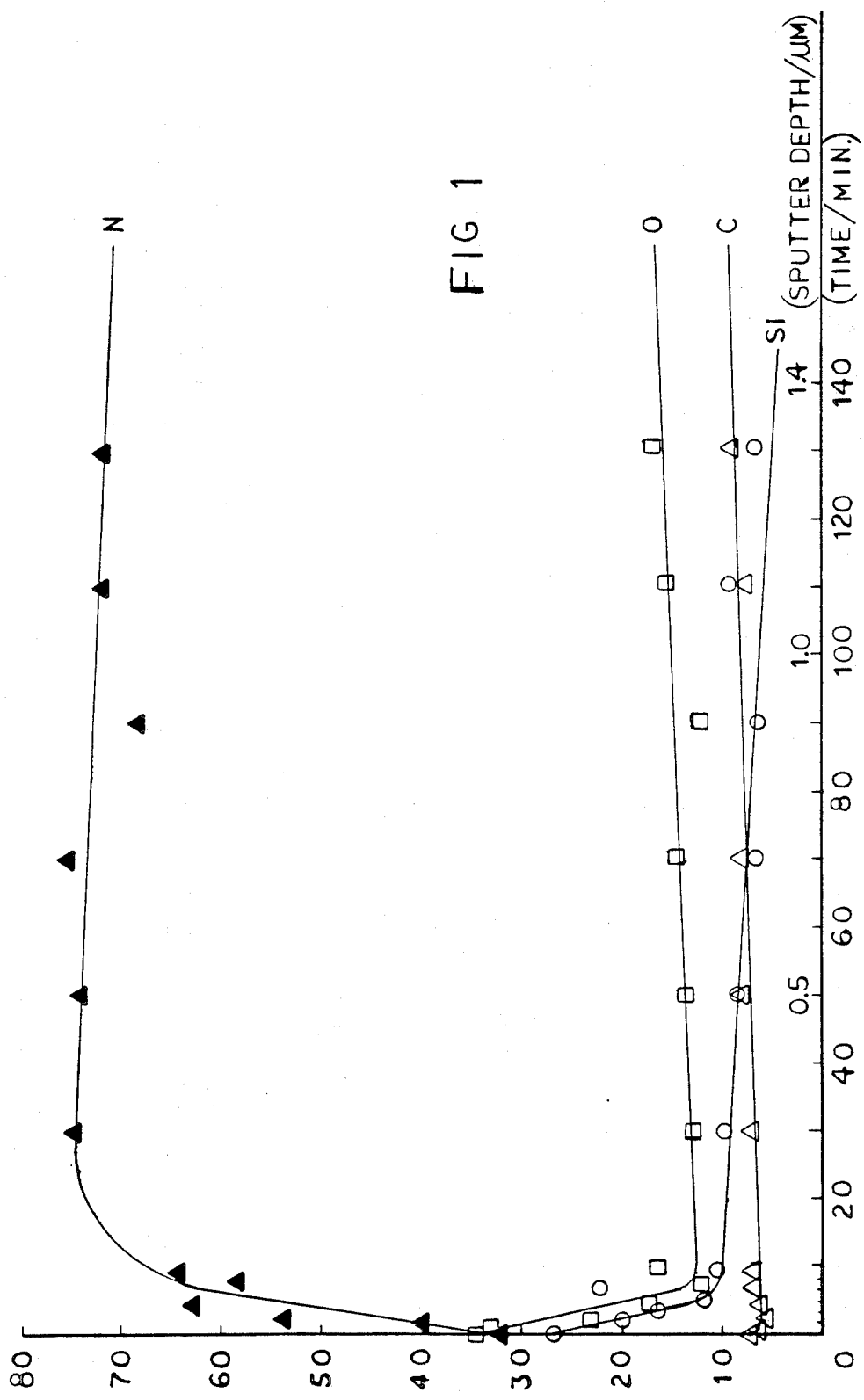
FIG. 1 is a graphic representation of the data from a sample of preceramic polymer which was cured for 5 minutes in ammonia plasma of example 3.

FIG. 1 is the data from a sample of preceramic polymer which was cured for 5 minutes in ammonia plasma. The polymer is the same as found in example 1, sample 1. The rate of sputter was about 10 nanometers/minute. The X axis shows the actual sputter depth in micrometers along with the time of sputter in minutes. The Y axis shows the weight percent of the elements. The symbols N, O, C and Si indicate the Nitrogen line, Oxygen line, Carbon line and Silicon lines respectively, while the symbols designating the points on those lines are indicated by solid triangle, open square, open triangle and open circle, respectively of Nitrogen, Oxygen, Carbon and Silicon.

Figure 2:
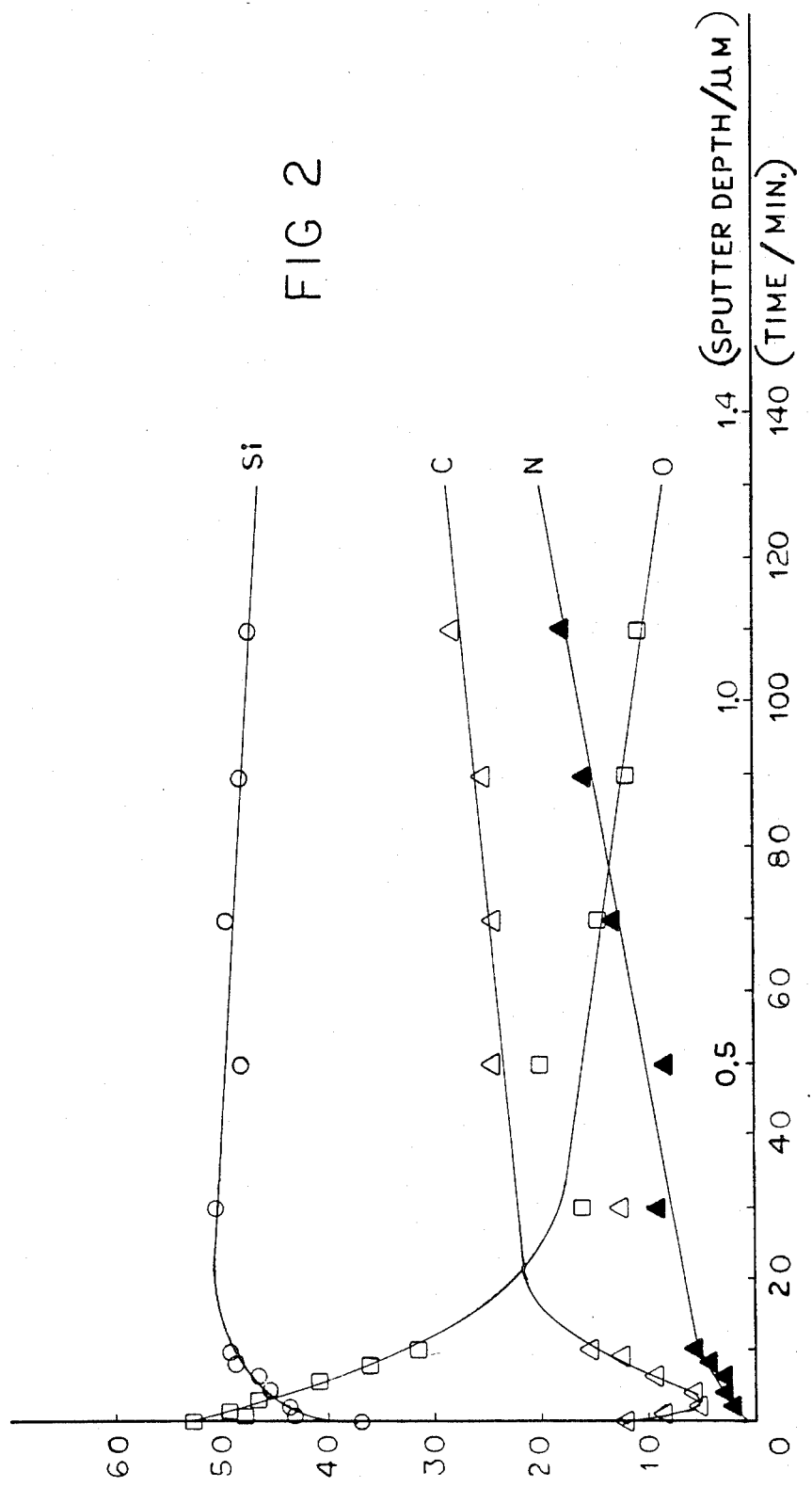
FIG. 2 is a graphic representation of the data from a sample of preceramic polymer cured for 1 hour in hydrogen plasma of example 3.

FIG. 2 shows the result of a preceramic polymer cured for 1 hour in Hydrogen plasma. The preceramic polymer is the same as that found in sample 1 of example 1. The sputtering rate was the same as for the sample of FIG. 1.

Figure 3:
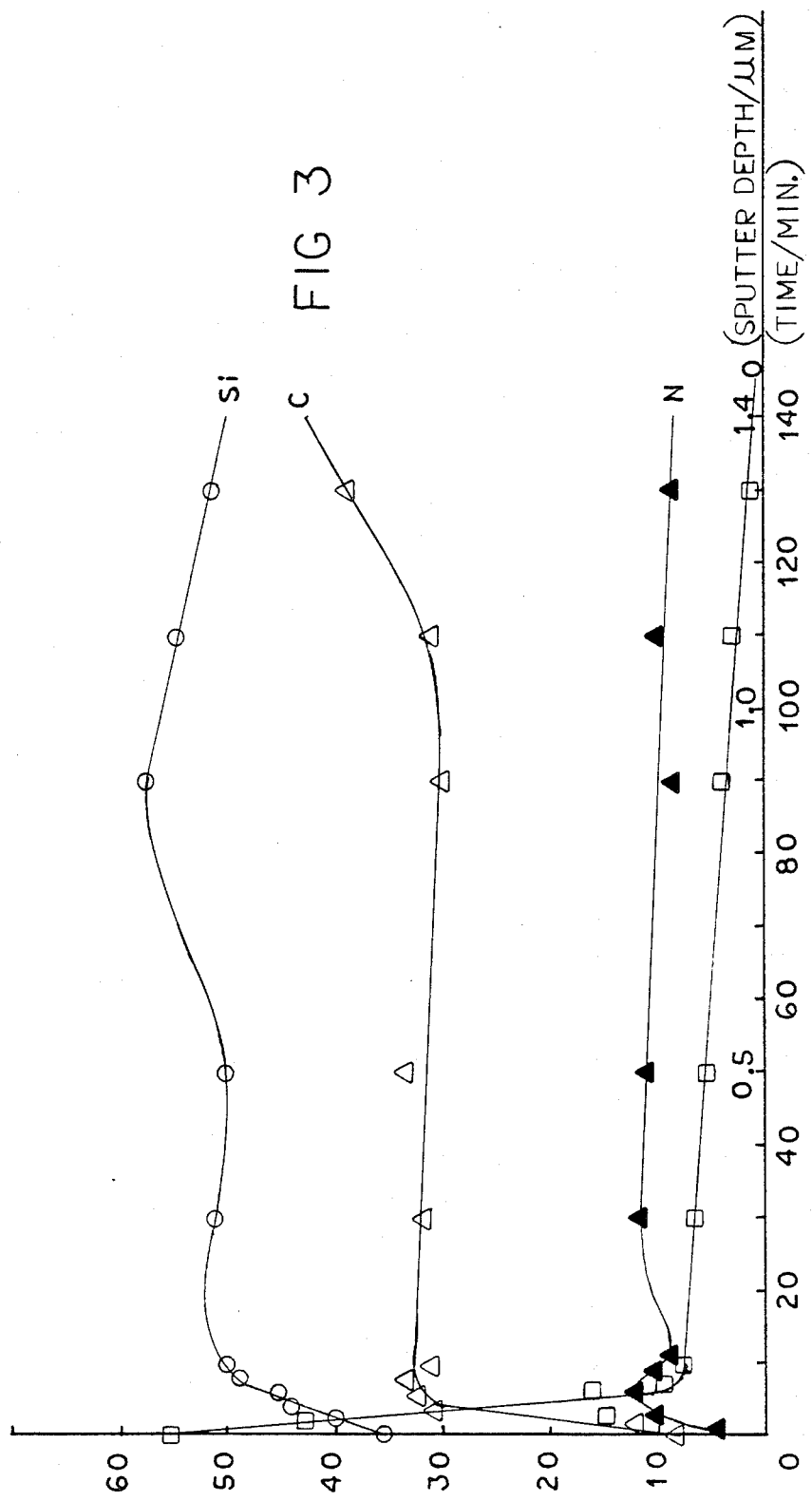
FIG. 3 is a graphic representation of the data from a sample of preceramic polymer cured for 1.5 hours in Nitrogen plasma of example 3.
Figure 4:
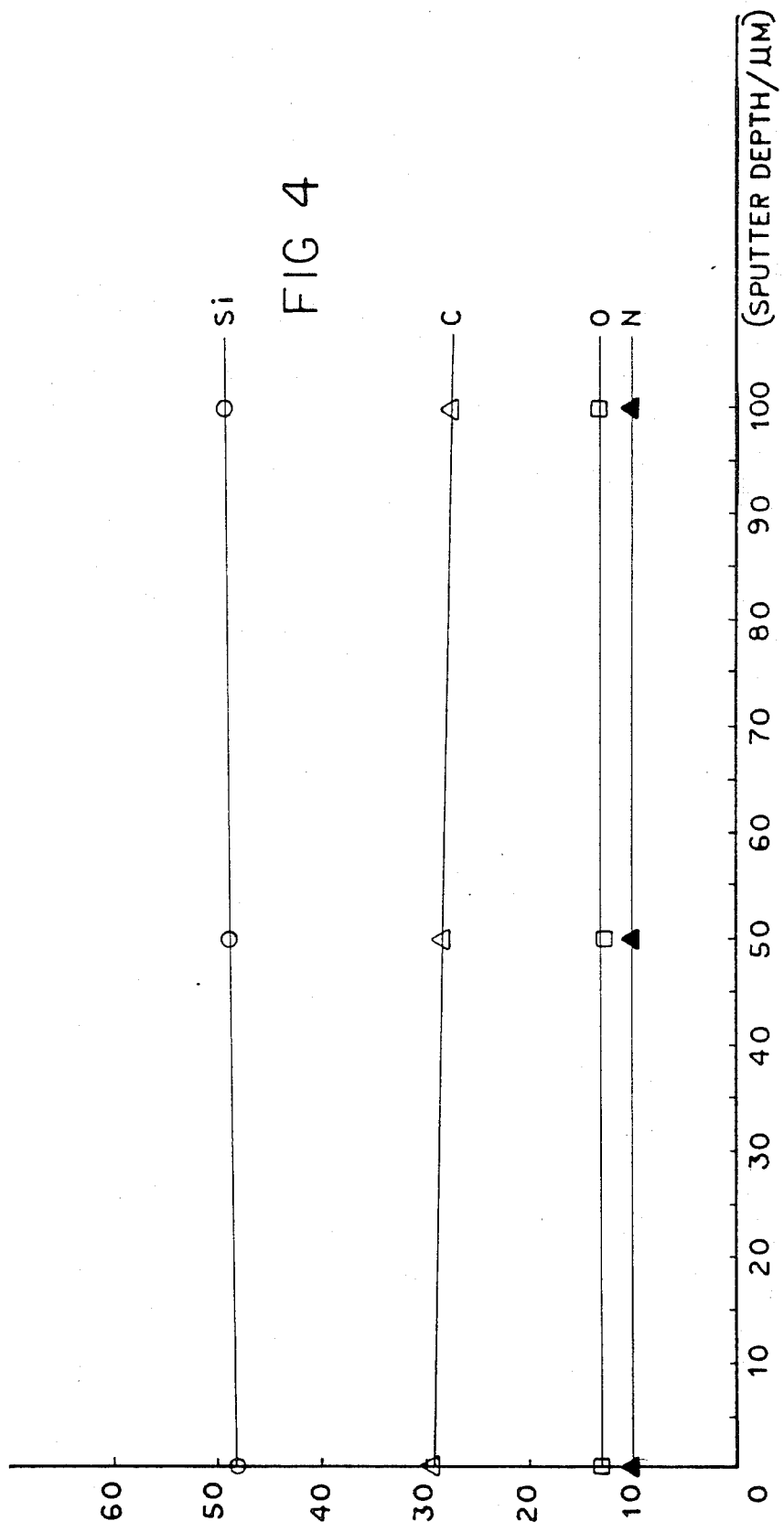
FIG. 4 is a graphic representation of the data from a sample of preceramic polymer cured in air from example 5.

FIG. 3, shows the result of a preceramic polymer cured for 1.5 hours in nitrogen plasma. A sputtering rate of 10 nanometers/minute was used.

Thus, this data clearly shows that plasmas can be used to cure preceramic polymers without the introduction of oxygen and that the surface of ceramic fibers can be chemically modified by appropriate choice of plasma gas and plasma parameters.

EXAMPLE 4

This example deals with treatment of a methylpolysilane prepared essentially by the method as set forth in Yajima in U.S. Pat. No. 4,100,233, except that the chlorine content had been reduced. It was handled the same as those in example 2. The results are found in table III and IV.

TABLE III

Plasma Treatment

| Sample | O % (green) | Time | ATMS. Ar | Press (torr) | Flow rate $cm^3$/min. | Sample Solubility |
|---|---|---|---|---|---|---|
| 1a | .57 | 45 min. | $A_2$ | .25 | 1 | yes |
| 1b | .57 | 2.0 hrs. | $NH_3$ | .25 | 1 | partial |
| 1c | .57 | 1.0 hrs. | $N_2$ | .25 | 1 | partial |
| 1d | .57 | 1.0 hrs. | $H_2$ | .25 | 1 | yes |

TABLE IV

Pyrolysis Data

| Sample | Result | % Char | % O | % C | % H | % N |
|---|---|---|---|---|---|---|
| 1a | melted | 52.6 | 1.12 | — | — | — |
| 1b | melted | 51.1 | 1.22 | 40.4 | Trace | 0.14 |
| 1c | melted | 52.3 | 1.16 | 39.2 | Trace | Trace |
| 1d | fused some fibers | 66.2 | 1.80 | — | — | — |

EXAMPLE 5

Air curing (not within scope of this invention.) Several ceramic fibers obtained by the method of Gaul in Example 1, were cured by exposure to air and ceramified. The resulting fibers had average diameters of 20 μm. The following SAM data is an average of several such fibers and the results can be found on TABLE V.

TABLE V

| Location of test on fiber | Air-Cured Ceramic Fibers Weight % | | | |
|---|---|---|---|---|
| | C | Si | O | N |
| Center (about 10μ from the surface) | 27.3 | 49.1 | 13.1 | 10.5 |
| Intermediate (about 5μ from the surface) | 28.1 | 48.8 | 12.8 | 10.2 |
| Surface (at or near the surface) | 29.5 | 47.7 | 12.8 | 10.0 |

This data shows no consistent trend in composition from center to the surface of the fiber. Appreciable amounts of undesired oxygen have been introduced into the fiber.

That which is claimed is:

1. A method of rendering shaped preceramic polymers infusible prior to pyrolysis, which method comprises treating a shaped preceramic polymer with a plasma of a gas selected from the group consisting of $NH_3$, $N_2$, $H_2$, $H_2O$, $O_2$, $BCl_3$, diborane, silanes, boranes, methylamine, hydrazine, and methane for a time sufficient to render the preceramic polymer infusible wherein the treatment temperature is sufficiently low so that the preceramic polymer remains unfused during the treatment step.

2. A method as claimed in claim 1 wherein the shaped preceramic polymer is a fiber.

3. A method as claimed in claim 1 wherein the plasma is ammonia gas.

4. A method as claimed in claim 1 wherein the plasma is methane gas.

5. A method as claimed in claim 1 wherein the plasma is nitrogen.

6. A method as claimed in claim 1 wherein the plasma is hydrogen gas.

7. A method as claimed in claim 1 wherein the plasma is water.

8. A method as claimed in claim 1 wherein the plasma is oxygen.

9. A method as claimed in claim 1 wherein the plasma is a silane.

10. A method as claimed in claim 1 wherein the plasma is a borane.

11. A method as claimed in claim 1 wherein the preceramic polymer is exposed to the plasma for a period of at least 5 minutes and for no more than three hours.

12. A method as claimed in claim 1 wherein the treatment with the plasma is carried out under pressure in the range of 0.05 torr to 5 torr.

13. A method as claimed in claim 1 wherein the treatment with the plasma is carried out under a gas flow of 0.01 cc/minute to 10 cc/minute.

14. A method as claimed in claim 1 wherein the preceramic polymer is a polysilazane preceramic polymer.

15. A method as claimed in claim 1 wherein the preceramic polymer is a polycarbosilane preceramic polymer.

16. A method as claimed in claim 1 wherein the preceramic polymer is a methylpolysilane preceramic polymer.

17. A method as claimed in claim 1 wherein the shaped preceramic polymer is a powder.

18. A method as claimed in claim 1 wherein the shaped preceramic polymer is a foam.

19. A method as claimed in claim 1 wherein the shaped preceramic polymer is a film.

* * * * *